United States Patent
Godin et al.

(10) Patent No.: US 7,651,304 B1
(45) Date of Patent: Jan. 26, 2010

(54) LOCK SYSTEM FOR IMMOBILIZING TRANSPORTED VEHICLE

(76) Inventors: Richard Godin, 1071 Heron, Gentry, AR (US) 72734; Donnie V. Bunker, 900 W. Tulsa St., Siloam Springs, AR (US) 72761

( * ) Notice: Subject to any disclaimer, the term of this patent is extended or adjusted under 35 U.S.C. 154(b) by 380 days.

(21) Appl. No.: 11/716,154

(22) Filed: Mar. 9, 2007

(51) Int. Cl.
*B60P 7/08* (2006.01)
(52) U.S. Cl. .................... 410/3; 410/7; 410/23
(58) Field of Classification Search ............ 410/3, 410/7, 10–12, 22, 23, 21, 97, 85; 254/246, 254/262; 70/26, 58; 403/45, 46, 48
See application file for complete search history.

(56) References Cited

U.S. PATENT DOCUMENTS

| | | | |
|---|---|---|---|
| 634,431 A | 10/1899 | Davis | |
| 1,393,614 A | 10/1921 | Ferragamo | |
| 1,538,412 A | 5/1925 | Stacy | |
| 2,053,522 A | 9/1936 | Gourley et al. | |
| 2,157,451 A | 5/1939 | Haubert | |
| 2,403,828 A | 7/1946 | Rawlins et al. | |
| 3,271,007 A | 9/1966 | Ratcliff | |
| 3,806,265 A | 4/1974 | Hattan | 403/46 |
| 4,182,454 A | 1/1980 | Tohms | 211/5 |
| 4,227,633 A | 10/1980 | Sellberg | 224/42.28 |
| 4,312,452 A | 1/1982 | Waier | 211/23 |
| 4,422,218 A | 12/1983 | Brasseux | 24/68 |
| 4,854,144 A | 8/1989 | Davis | 70/226 |
| 4,874,284 A | 10/1989 | New, Jr. | 414/537 |
| 5,106,245 A | 4/1992 | Fritz et al. | 410/9 |
| 5,593,260 A | 1/1997 | Zimmerman | 410/20 |
| 6,000,255 A | 12/1999 | Lester | 70/226 |
| 6,099,219 A | 8/2000 | Bartholomay | 410/20 |
| 6,920,771 B1 | 7/2005 | Griffith | 70/225 |
| 6,932,550 B1 * | 8/2005 | Hope | 410/3 |

* cited by examiner

*Primary Examiner*—Stephen Gordon
(74) *Attorney, Agent, or Firm*—Keisling Pieper + Scott PLC; Meredith K. Lowry (57) ABSTRACT

The invention features a locking coupling for securing a transported vehicle within a carrier vehicle. The locking coupling features an turnbuckle attachment having adjustable arms for securing to the frame of a transported vehicle and a load binder assembly having a tensioner.

20 Claims, 4 Drawing Sheets

LOCK SYSTEM FOR IMMOBILIZING TRANSPORTED VEHICLE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The invention pertains to improvements in locking devices, and more particularly to an improved locking device for a transported vehicle. Known art can be found in Class 70, Subclasses 26 and 58.

2. Description of the Known Art

As will be appreciated by those skilled in the art, various locking devices have been utilized to secure vehicles for transport. Traditionally, vehicles such as all-terrain vehicles (ATVs) have been transported from one location to another via flat-bed trailers. A flat-bed trailer is a trailer having a bed welded to its frame. ATV users may utilize tie-down straps made from bungee cords or nylon ropes to secure the transported ATV to the flat-bed trailer. Normally, a number of tie-down straps are fastened to an axle of the transported vehicle and also fastened to the frame of the flat-bed trailer. Further, ATV users may utilize a wheel lock to secure the transported ATV to the flat-bed trailer.

However, the destructible material of the tie-down straps, the awkward positioning of the tiedown straps with respect to the transported ATV and the flat-bed trailer, and the limited securing capabilities of the wheel locks, it is possible for the transported ATV to become unsecured. In particular, ATVs often bounce up and down on the flat-bed trailer during transportation. In some extreme circumstances, the tie-down straps have become unfastened to either the transported ATV or to the flat-bed trailer and the ATV has fallen off the flat-bed trailer during transportation; thereby providing a significant hazard and danger to passengers in other vehicles.

Thus, there is a need for an apparatus which can securely fasten an ATV to a flat-bed trailer or another vehicle during transportation of the ATV from one location to another. The apparatus must secure the apparatus during transportation to prevent an ATV from falling off the flat-bed trailer. Also, the apparatus should secure the transported ATV to a flat-bed trailer such that the transported ATV cannot be easily removed from the flat-bed trailer unless desired.

Patents disclosing information relevant to locking devices include U.S. Pat. No. 4,182,454, issued to Tohms on Jan. 8, 1980; U.S. Pat. No. 4,227,633, issued to Sellberg on Oct. 14, 1980; U.S. Pat. No. 4,312,452, issued to Waier on Jan. 26, 1982; U.S. Pat. No. 4,854,144, issued to Davis on Aug. 8, 1989; U.S. Pat. No. 4,874,284, issued to New on Oct. 17, 1989; U.S. Pat. No. 5,106,245, issued to Fritz et al. on Apr. 21, 1992; U.S. Pat. No. 5,593,260, issued to Zimmerman on Jan. 14, 1997; U.S. Pat. No. 6,000,255, issued to Lester on Dec. 14, 1999; U.S. Pat. No. 6,099,219, issued to Bartholomay on Aug. 8, 2000; and U.S. Pat. No. 6,920,771, issued to Griffith on Jul. 26, 2005. Each of these is expressly incorporated by reference.

Patents disclosing information relevant to tumbuckles include U.S. Pat. No. 634,431, issued to Davis on Oct. 3, 1899; U.S. Pat. No. 1,393,614, issued to Ferragamo on Oct. 11, 1921; U.S. Pat. No. 2,053,522, issued to Gourley et al. on Sep. 8, 1936; U.S. Pat. No. 2,403,828, issued to Rawlins et al. on Jul. 9, 1946; and U.S. Pat. No. 3,806,265, issued to Hattan on Apr. 23, 1974. Each of these is expressly incorporated by reference.

Patents disclosing information relevant to load binders include U.S. Pat. No. 1,538,412, issued to Stacy on May 19, 1925; U.S. Pat. No. 2,157,451, issued to Haubert on May 9, 1939; U.S. Pat. No. 3,271,007, issued to Ratcliff on Sep. 6, 1966; and U.S. Pat. No. 4,422,218, issued to Brasseux on Dec. 27, 1983. Each of these is expressly incorporated by reference.

U.S. Pat. No. 4,182,454, issued to Tohms on Jan. 8, 1980, entitled Security stand for motorcycle, teaches a security stand is provided which secures a motorcycle and each of its major, valuable components against theft. The stand does not utilize a padlock or chain either of which can be attacked by acid, quickly supercooled and embrittled by a cryogen, or easily cut with an oxyacetylene torch. The stand does utilize an internal locking means such as a dead bolt, which engages the ends of cross bar pipes necessarily containing cementitious material, which pipes are inserted in passages through a pair of angulated arms. The arms extend upwardly from a base, and, preferably both arms and base are also filled with cementitious material. The angulation of the arms is such that they do not provide a horizontal surface against which a hydraulic jacking means may be biased in cooperation with the base, or ground upon which the base is disposed. The cross bar pipes function as locking members when they are inserted through openings between the frame and engine of the motorcycle and locked.

U.S. Pat. No. 4,227,633, issued to Sellberg on Oct. 14, 1980, entitled Wheel-locking device to secure vehicles on the cargo platform of transport vehicles, teaches a wheel-locking device to secure vehicles on transport vehicle platforms, comprising a pivotally mounted stop member arranged to engage and hold the vehicle wheel in its raised position, a telescopic arm with controlled extension and retraction. At the outer end of said arm is pivotally mounted a bow arranged to be applied over the vehicle wheel. The telescopic arm is pivotally mounted at its lower point of attachment and so directed that in its raised position for the purpose of applying said bow over the vehicle wheel, said arm forms an acute angle to a vertical plane extending at right angles to the arm pivot axis through said point of attachment and is positioned on the opposite side of said vertical plane relative to the plane formed by said raised stop member, whereby said wheel will be firmly secured between said bow and said stop member.

U.S. Pat. No. 4,312,452, issued to Waier on Jan. 26, 1982, entitled Vehicle theft protection device, teaches a frame into which a forward end of an automotive vehicle is driven, and secured, so as to prevent vehicle theft, the frame including adjustable bars, so as to clamp snugly against the vehicle, and, in one design, also including rollers against the vehicle wheels, that prevent the vehicle from riding off the frame.

U.S. Pat. No. 4,854,144, issued to Davis on Aug. 8, 1989, entitled Vehicle immobilization device, teaches a one piece "Denver Boot" type vehicle immobilization device which may be effectively stored, transported to the site, and very quickly and efficiently applied, having a hub shield which prevents access to a lug nut of the immobilized vehicle's tire and which has an integral locking housing. The device has an adjustable arm which slides in the housing to open and close the device for application and removal, which locks in the immobilizing position, and which is interconnected to two articulating arms which traverse the tire tread and engage the inside of the tire in the immobilizing position.

U.S. Pat. No. 4,874,284, issued to New on Oct. 17, 1989, entitled Kit for transporting all terrain vehicles, teaches a kit for adapting a pickup truck for safely loading, transporting, and unloading two all terrain vehicles over the truck's bed area while preserving cargo space in the bed area. The kit includes a platform having a frame and flooring with dimensions sufficient to park two standard size all terrain vehicles thereon with the vehicles facing perpendicular to the length of the truck. The platform is mounted on the sidewalls of the truck such that the flooring is approximately even with the tops of the sidewalls, thus preserving significant cargo space under the flooring. Because it is safer when moving all terrain vehicles on a incline to always travel forward, the kit is designed for loading the vehicles on one side of the platform and unloading on the other. Toward this end, the kit's safety barrier, which is for preventing vehicles being loaded from one side from being accidentally driven off the other side, is hingedly attached and may be lowered and passed over while unloading.

U.S. Pat. No. 5,106,245, issued to Fritz et al. on Apr. 21, 1992, entitled Wheel chocks for use on vehicle transport carriers, teaches a chock for use in securing four wheel vehicles such as automobiles to the deck-mounted rail of a transport carrier includes a frame, with the frame having a pocket formed and adapted to mount the frame laterally over the deck-mounted rail. The rail has a series of transverse openings and the frame has at least one pin extending from the side of the pocket and positioned to extend through a rail opening. There is a locking member pivotally mounted to the frame on an axis perpendicular to the frame pin or pins. The locking member has a handle portion outside of the frame and a rail engaging portion movable within the pocket and arranged to bear against one side of the rail to secure the frame pin or pins within the rail openings and thus the frame to the rail. There is a latch for holding the locking member in a locking position. A rotatable rod is mounted in the frame and has a tire engaging web attached to it with rotation of the rod tightening or releasing the web.

U.S. Pat. No. 5,593,260, issued to Zimmerman on Jan. 14, 1997, entitled Apparatus for securing a vehicle to a trailer, teaches an apparatus for securing a vehicle, such as an all-terrain vehicle, to a trailer of the type towed by a car or truck is disclosed. The apparatus includes a cylindrical sleeve capable of being fastened to the trailer. First and second wheel stop bars are connected substantially perpendicular to the cylindrical sleeve. A lift bar has a body, a first arm, a first finger, a second arm and a second finger. The body of the lift bar is positioned substantially within the cylindrical sleeve for rotational movement about an axis within the cylindrical sleeve. A first chain is connected to the first finger of the lift bar and connected to the first wheel stop bar for securing a first wheel of the vehicle to the trailer. A first chain is connected to the second finger of the lift bar and connected to the second wheel stop bar. With the apparatus properly applied, the vehicle can be securely transported on the trailer.

U.S. Pat. No. 6,000,255, issued to Lester on Dec. 14, 1999, entitled Anti-theft device for all-terrain vehicles, teaches an anti-theft device for all-terrain vehicles comprising a hollow frame upon which the front or rear wheels of a vehicle rest, said frame being secured to a stable surface, locking structure substantially embedded within the frame, two slidable members engaged with the locking structure, and two wheel engaging end members affixed to the exposed end of said slidable members, which wheel engaging end members press against the wheel hubs of a vehicle thereby prohibiting removal of the vehicle from the stable surface when the locking structure is engaged.

U.S. Pat. No. 6,099,219, issued to Bartholomay on Aug. 8, 2000, entitled ATV tie down rack system, teaches an ATV tie down rack system for securing an ATV to a trailer or the bed of a pickup without requiring tie-down straps. The inventive device includes a tube member, a center bracket having two apertures extending from the tube member, a first support member attached to the tube member, a second support member attached to the tube member opposite of the first support member, a catch member having a U-shape rotatably positioned within the tube member, a pair of angled members extending orthogonally from the distal ends of the catch member, a first ratchet having a first strap, and a second ratchet having a second strap. The first strap and the second strap are slidably attached to the catch member and the angled members for allowing them to be easily moved away from the path of the tire of the ATV. The first ratchet and the second ratchet are utilized to tighten the respective straps about the tires of the ATV thereby retaining the ATV upon the trailer or pickup.

U.S. Pat. No. 6,920,771, issued to Griffith on Jul. 26, 2005, entitled Lock-down device for an all-terrain vehicle, teaches a lock-down device for use on an all-terrain vehicle, comprised of a rectangular base which mounts to a surface such as a garage floor or bed of a pick-up truck, four sockets mounted at each corner of the base, a flat rear panel with two bolts pivotally articulating on its bottom edge, a wheel cover, a flat rear panel which pivotally articulates with the wheel cover and which has two bolts on the bottom edge of the rear panel. The bolts on the rear panel and the front panel register with the four sockets on the base. The rear panel engages with the wheel cover by a latching mechanism. However, some vehicles, such as a dirt bike may be transported in a manner not conducive to utilizing this locking device.

Many of the locking devices previously taught secure the wheel of the transported vehicle from further movement, but do not secure the transported vehicle to the carrier vehicle. This arrangement leaves the transported vehicle still vulnerable from theft as the locked vehicle may be removed to another location for subsequent removal of the locking device. Other applications teach securing the locked wheel to the carrier vehicle; however these applications are lacking as the frame of the transported vehicle is vulnerable still. As will be appreciated by one skilled in the art, a locked wheel of a transported vehicle may be removed, thereby releasing the frame of the vehicle. Further, securing the wheel alone does not adequately secure the vehicle as the wheel and axle are adapted to move easily, thereby allowing the transported vehicle to move during transport. Securing the frame of the vehicle eliminates these problems.

It is evident from the past attempts that an improved locking device for a transported vehicle is desirable. Thus, it may be seen that these prior art patents are very limited in their teaching and utilization, and an improved locking device for a transported vehicle is needed to overcome these limitations.

SUMMARY OF THE INVENTION

The present invention addresses the perceived needs in the known art discussed above. In one exemplary embodiment in accordance with the present invention a locking coupling for securing a transported vehicle within a carrier vehicle is provided. The locking coupling immobilizes the frame of a transported vehicle within a carrier vehicle by tightly connecting the frame of the transported vehicle to an anchor located on the carrier vehicle. The locking coupling utilizes a stand, a turnbuckle attachment, a load binder, and a lock to secure the frame to the carrier vehicle. The stand assists in securing the transported vehicle as it creates an additional impediment to movement of the transported vehicle when the transported vehicle frame is rested upon the stand above the anchor of the carrier vehicle and engaged by the locking coupling. The turnbuckle attachment of the locking coupling provides turnbuckle arms between the stand legs preventing movement of the stand underneath the transported vehicle frame.

Figure 1:
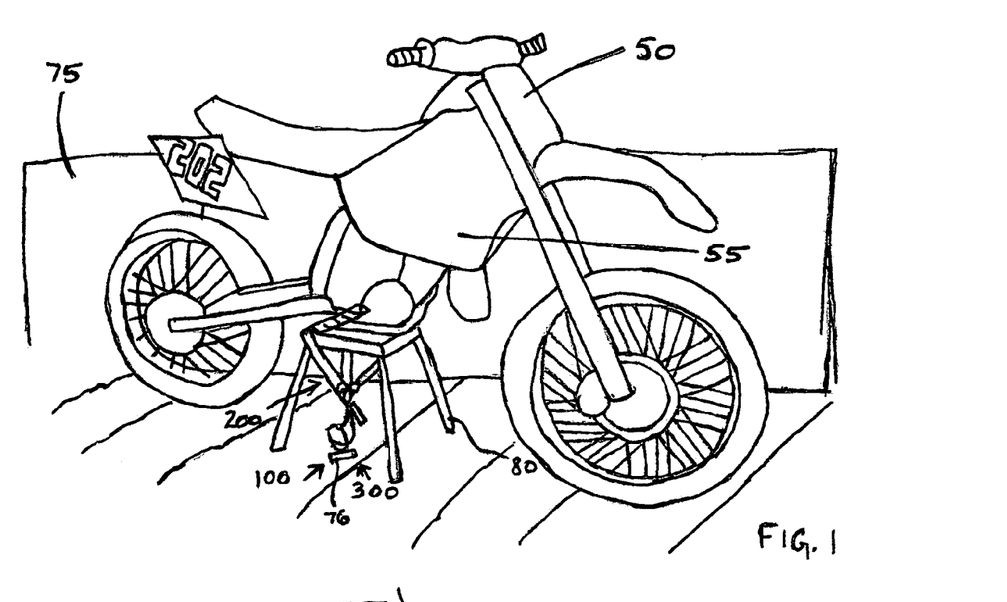
FIG. 1 is an environmental view of my improved locking coupling securing a vehicle for transportation in accordance with the present invention.

In the figures as presented, FIG. 1 shows the locking coupling securing a vehicle to a foundation. As contemplated, the locking coupling can be used to secure a vehicle to a foundation in a fixed location or to a carrier vehicle for transport. In both embodiments, the foundation and the carrier vehicle contain an anchor for securing to the locking coupling. The locking coupling secures to the anchor at the hook arm of the device while the turnbuckle arms of the device attach to frame of the vehicle. The locking coupling attaches to the frame of the vehicle at an immobile part of the frame. For instance, the locking coupling may attach to the foot rests of a motorcycle. Additionally, the locking coupling may attach to a portion of the frame which is mobile but becomes immobile upon attachment of the locking coupling. For instance, the pedals of a bicycle will rotate until the movement of both pedals is impeded. Upon securing the turnbuckle arms to the vehicle and the hook arm to the foundation, the load binder provides tension within the coupling to secure the vehicle to the foundation.

Figure 2:
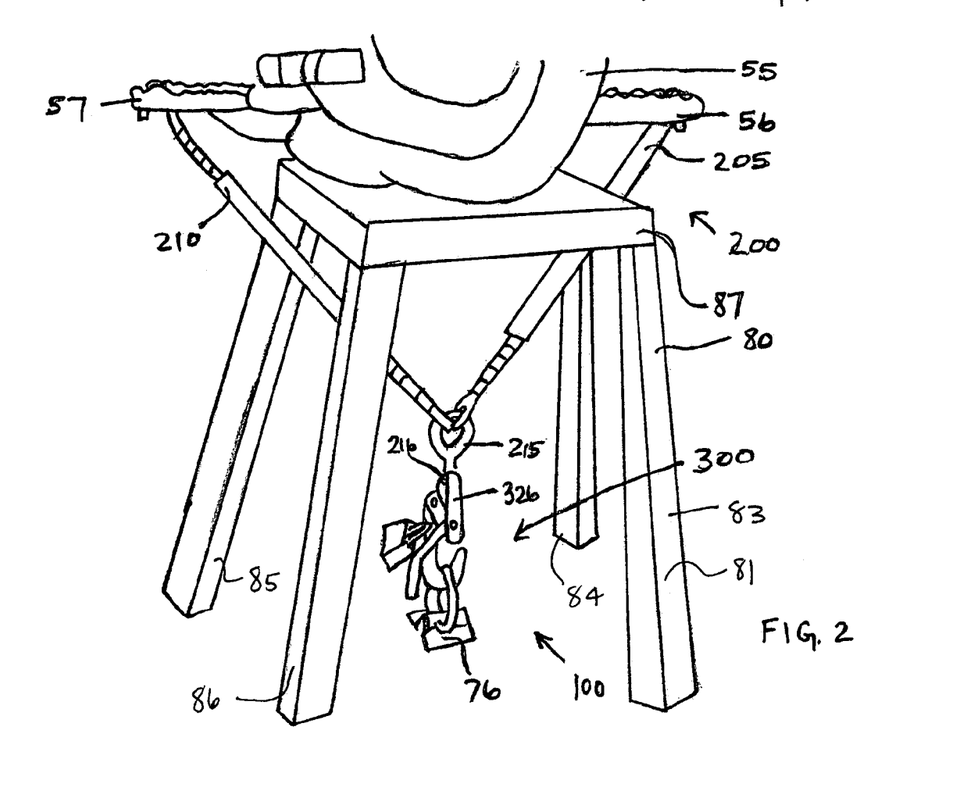
FIG. 2 is an enlarged left side perspective view of the invention taken generally from the left side of FIG. 1.

FIG. 2 shows a closer view of the locking coupling. Specifically, the figure shows the immobile portion of the frame of the vehicle, the locking coupling, a stand for placement beneath the frame of the vehicle, and an anchor secured to a foundation. The stand provides a means for lifting the vehicle suspension from the ground or foundation. As shown, the locking coupling attaches to the frame of the vehicle at the foot rests of a vehicle. Upon securing the turnbuckle arms to the vehicle and the hook arm to the foundation, the tensioning from the lever load binder in its engaged position secures the vehicle to the foundation. Upon securing the locking coupling, a lock shackle may be placed within an aperture on the load binder to prevent further movement or release of the load binder from its engaged position.

Figure 3:
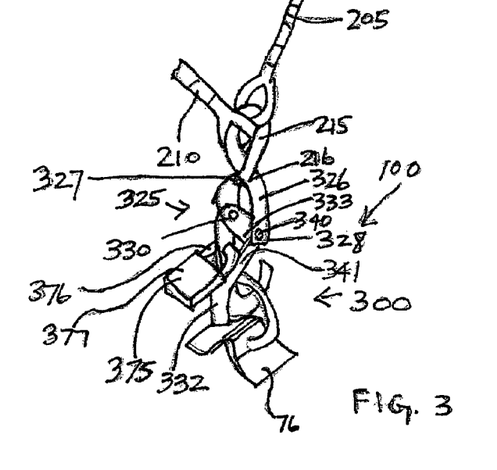
FIG. 3 is a left side perspective view of the locking assembly of my improved locking coupling.

FIG. 3 shows a closer view of the engaged position of the load binder. Upon securing the turnbuckle arms to the vehicle and the hook arm to the foundation, the tensioning from the lever load binder in its engaged position secures the vehicle to the foundation. Upon securing the locking coupling, a lock shackle may be placed within an aperture on the load binder to prevent further movement or release of the load binder from its engaged position.

Figure 4:
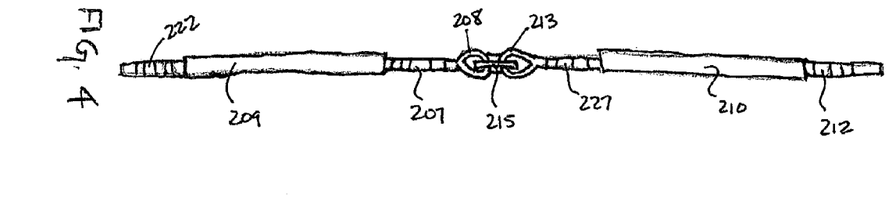
FIG. 4 is a top plan view of the same.

FIG. 4 depicts the top plan view of the locking coupling, primarily showing the turnbuckle arms. As shown, pivot point allowing movement of the turnbuckle arms is visible.

Figure 5:
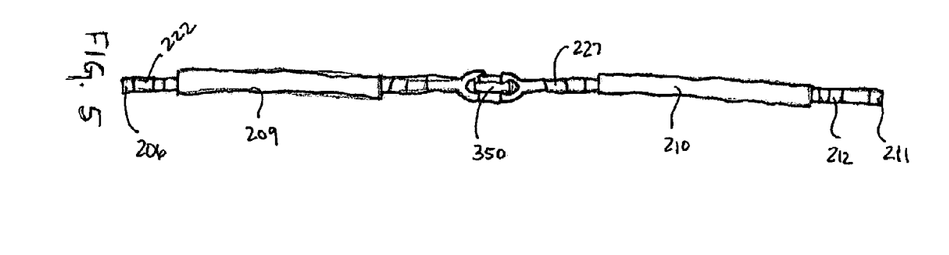
FIG. 5 is a bottom plan view of the same.

FIG. 5 depicts the bottom plan view of the locking coupling, primarily showing the turnbuckle arms. As shown, the hook terminus of the turnbuckle arms and the hook arm of the load binder are visible.

Figure 6:
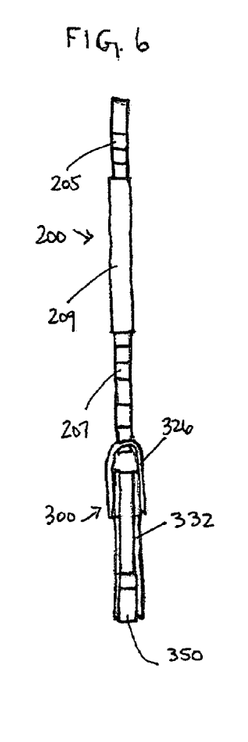
FIG. 6 is left side elevational view of the same.

FIG. 6 depicts the left side elevational view of the locking coupling, primarily showing the left turnbuckle arm and the load binder. As shown, the hook arm of the load binder is visible.

Figure 7:
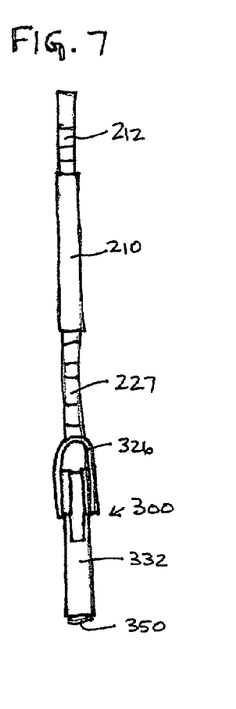
FIG. 7 is a right side elevational view of the same.

FIG. 7 shows a right side elevational view of the locking coupling, primarily showing the right turnbuckle arm and the load binder. As shown, the lever arm of the load binder is visible.

Figure 8:
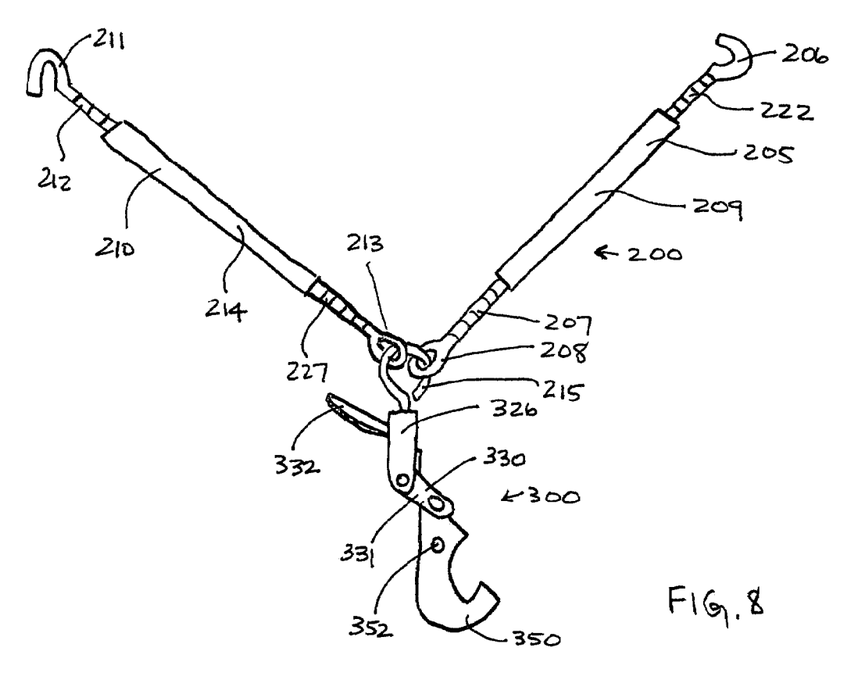
FIG. 8 is a back side elevational view of the same.

FIG. 8 depicts a back side elevational view of the locking coupling showing the turnbuckle arms, the pivot point, and the load binder in a released position.

Figure 9:
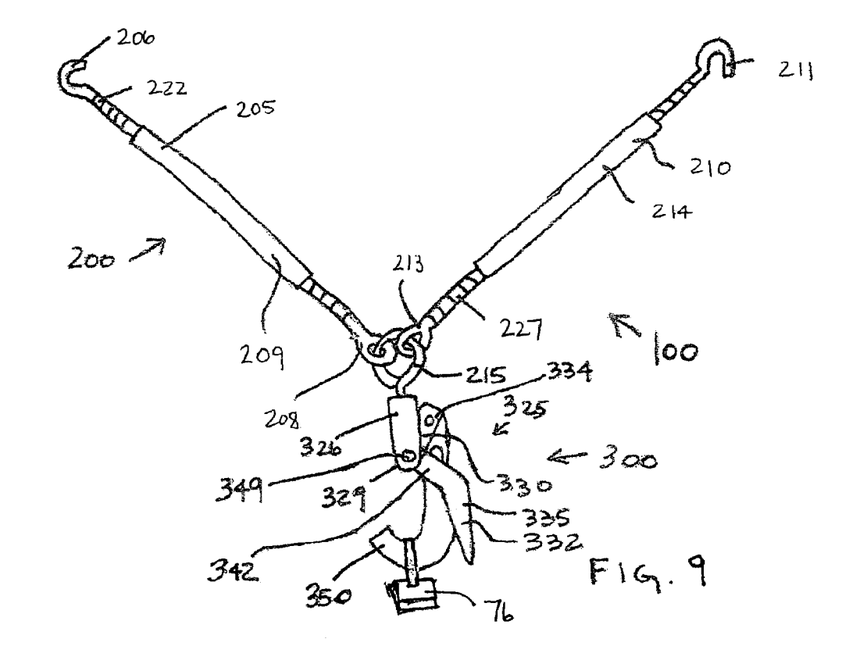
FIG. 9 is a front side elevational view of the locking coupling showing the locking assembly in the engaged position.

FIG. 9 depicts a front side elevational view of locking coupling showing the turnbuckle arms, the pivot point, and the load binder in the engaged position with the anchor.

Figure 10:
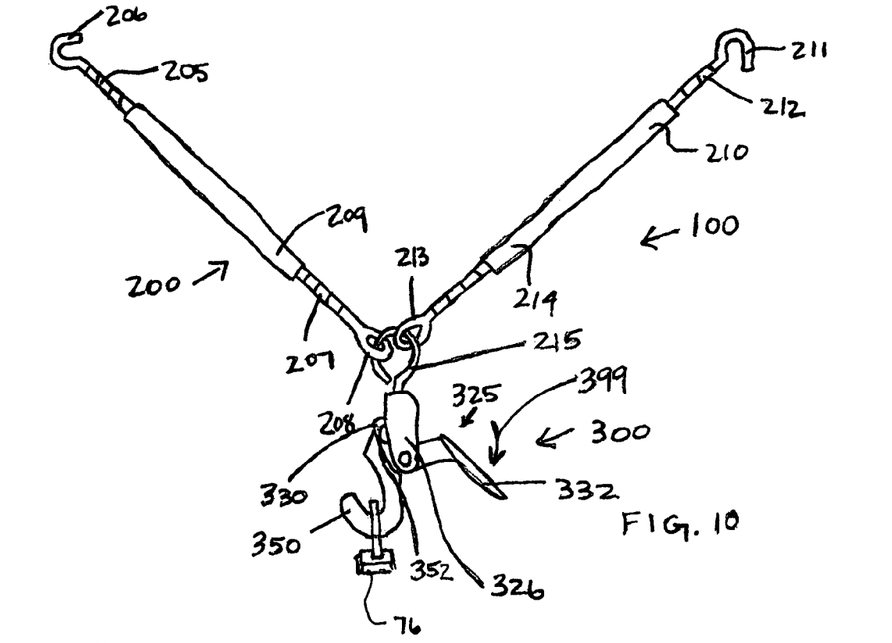
FIG. 10 is a front side elevational view of the locking coupling showing the locking assembly in a partially engaged position.

FIG. 10 depicts the front side elevational view of locking coupling in a partially engaged position and shows the movement of the lever arm downward for engagement with the anchor.

Figure 11:
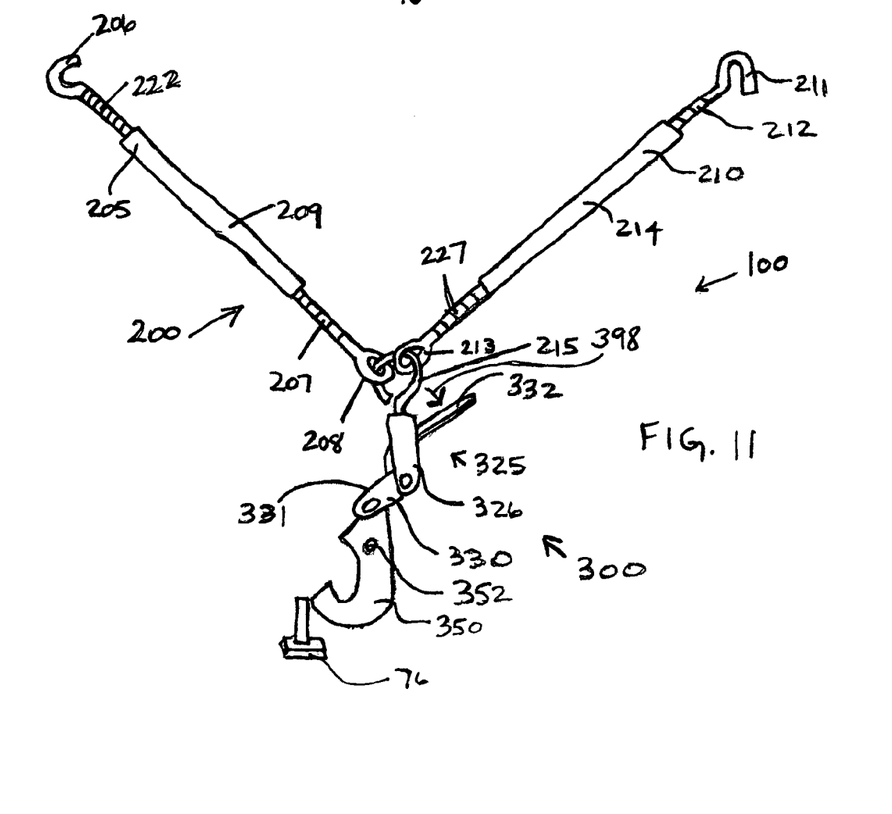
FIG. 11 is a front side elevational view of the locking coupling showing the locking assembly in a released position.

FIG. 11 depicts the front side elevational view of locking coupling in a released position and shows the movement of the lever arm downward. The anchor and the hook arm are disengaged.

It is an object of the present invention to provide an improved locking coupling for transported vehicles.

It is a further object of this invention to provide a locking coupling that secures a transported vehicle within a carrier vehicle.

It is a further object of this invention to provide a locking coupling that secures the frame of a transported vehicle to a carrier vehicle.

Another object of the present invention is to provide a locking coupling which secures the frame of a transported vehicle from movement during travel.

It is an object of the present invention to provide a locking coupling for a demountable attachment to a carrier vehicle which allows that carrier vehicle to transport the transported vehicle.

Another object of the present invention is to provide a locking coupling which is simple to attach to the transported vehicle and provides easy loading and unloading of the transported vehicle.

Another object of the present invention is to provide a locking coupling which has substantially thickened exposure areas thereby deterring theft of locked transported vehicle.

Another object of the present invention is to provide a pivoting locking coupling which provides a versatile locking assembly for a transported vehicle.

Another object of the present invention is to provide a locking coupling with adjustable arm members which provides a versatile locking assembly for a transported vehicle.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Generally speaking, the invention is directed to a locking coupling for securing a transported vehicle within a carrier vehicle. In particular, the locking coupling features multiple attachment arms for securing the frame of a transported vehicle and a load binder having a cam action tensioner. In another embodiment, the locking coupling secures the frame of a vehicle to a foundation.

As shown in FIG. 1, the locking coupling 100 includes a turnbuckle attachment 200 and a locking assembly 300. The transported vehicle 50 is placed within or upon a carrier vehicle 75 for transport between locations. The vehicle 50 may also be secured to a fixed location by securing the locking coupling 100 to the frame of the vehicle 50 and an anchor 76 connected to the foundation. A stabilizing block 80, such as a stand 81 having multiple legs, may be placed under the transported vehicle 50 to stabilize the transported vehicle 50 and to remove tension from the suspension of the vehicle 50. As shown, the turnbuckle arms 200 connect to a location on the frame 55 of the transported vehicle 50. In particular, the turnbuckle arms 200 may connect to the foot rests 56, 57 of the transported vehicle 50.

As shown in FIGS. 1-2, the turnbuckle arms may extend upwards to the foot rests and connect to the foot rest from within the interior of the foot rest. It is also contemplated that the turnbuckle arms may connect to the foot rest from outside the exterior of the foot rest. The load binder assembly 300, connected to the turnbuckle arms 200, then is secured to the carrier vehicle 75 at an anchor 76 located within the carrier vehicle 75. In this manner, the transported vehicle 50 is secured to the carrier vehicle 75 for transport. In another embodiment, the load binder assembly 300, connected to the turnbuckle arms 200, then is secured to the anchor 76 secured to a foundation, such as a wall or the ground, in a fixed location. In this manner, the vehicle 50 is fixed at any location having an anchor 76.

FIG. 2 depicts the placement of the locking coupling 100 in conjunction with the stand 81. As used with the stand 81, the turnbuckle arms 200 angle upwards from the load binder 300 between the legs 83, 84, 85, 86 of the stand. In this manner, the stand 81 works with the locking coupling 100 to prohibit movement of the transported vehicle 50. The legs of the stand prohibit substantial sideways movement of the turnbuckle arms 200 and the top 87 of the stand prohibits substantial vertical movement of the turnbuckle arms 200. In this manner, the locking coupling 100 is biased to maintain its locking configuration.

FIG. 3 depicts the load binder assembly 300 portion of the locking coupling 100. In particular, the load binder assembly 300 is shown with the locking shackle 375 maintaining the engaged position of the load binder assembly. The locking shackle 375 is placed within a lock aperture 352 of the load binder assembly 300 while engaged with the anchor 76 attached to the foundation or carrier vehicle. The locking shackle 375 prohibits movement of the load binder assembly 300 by prohibiting movement of portions of the load binder assembly.

As shown in more detail in FIGS. 4-11, the turnbuckle arms 200 of the present invention includes multiple adjustable turnbuckle arms 205, 210 movably connected to a pivot point ring 215 allowing the adjustable arms 205, 210 to be freely positioned prior to engagement of the coupling 100. It is envisioned that the pivot point 215 can include other structures which would allow the adjustable arms 205, 210 freedom of movement within the pivot point. Each adjustable turnbuckle arm 205, 210 is composed of threaded bolt 222, 212 having a hook terminus 206, 211 and threaded bolt 207, 227 having an eyelet 208, 213 terminus. The adjustable turnbuckle arm 205, 210 may be open exposing the threaded bolts or include a sleeve member 209, 214 enclosing the turnbuckle arm 205, 210. The hook terminus 206, 211 is adapted to connect to the frame 55 of the transported vehicle. The eyelet terminus 208, 213 enclose the pivot point ring 215 allowing the adjustable arms 205, 210 freedom of movement. The threaded shafts 207, 227, 212, 222 are adapted to increase the tension for the locking coupling 100 by rotating the sleeve member 209, 214 which rotates the threaded shafts inward or outward within the sleeve member 209, 214. In this manner, a user of the locking coupling 100 can manipulate the length and tension of the turnbuckle arms 200 upon attachment to the transported vehicle 50.

As shown in FIGS. 8-11, the load binder assembly 300 of the present invention includes a locking shackle 375 and a load binder 325 connected to the pivot point ring 215 and having a hook arm 350. The load binder is adapted to be biased by the locking shackle 375. The load binder assembly 300 connects the turnbuckle arms 200 secured to the transported vehicle 50 to the anchor 76 secured to the carrier vehicle 75.

The load binder 325 is connected to the pivot point ring 215 at the load binder base 326. The pivot point ring 215 extends into an aperture of the load binder base 326 and is secured to the base 326 by a bolt 216 on the underside of the base 326. As shown, the load binder base 326 is a u-shaped structure with the vertex 327 of the structure at the point of connection with the pivot point ring 215. On each prong 328, 329 of the load binder base 326, the lever complex 330 is connected. The lever complex 330 includes an extension arm 331 and a lever arm 332. As shown in FIG. 3, the lever arm 332 is attached to the load binder base 326 by two fasteners 340, 349. The lever arm 332 includes a u-shaped structure with an elongated arm 335 extending from the vertex of the u-shaped structure. Each prong of the u-shaped lever arm 332 is fastened to a respective prong 328, 329 of the load binder base 326. The prongs 341, 342 of the lever arm 332 are then connected to the extension arm at the lever arm terminus 333 of the extension arm 331 by the same fasteners 340, 349 connecting the lever arm 332 to the load binder base 326.

The extension arm 331 further includes a hook arm terminus 334 for connection to the hook arm 350. In this manner, the lever arm 332 flanks the extension arm 331 and the hook arm 350.

As shown in FIGS. 9-11, movement of the lever arm 332 downward from the pivot point ring 215 biases the extension arm 331 upward towards the pivot point ring 215. Specifically, in FIG. 9, the locking coupling 100 is shown in the engaged position with the hook arm 350 secured to the anchor 76. The lever arm 332 is shown in a downward configuration, forcing the extension arm 331 over center of the pivot point 215 and load binder base 326. In this manner, the hook arm 350 connected to the extension arm 331 is forced upward towards the pivot point and over center of the load binder base 326 into a hook engaged position. The hook arm 350 includes a lock aperture 352 for placement of a locking shackle 375 or similar structure. When the hook arm 350 is placed in the hook engaged position, the lock aperture 352 is positioned between the prongs 341, 342 of the lever arm above the lever arm elongated arm 335. In this manner, when the locking shackle 375 is placed within the lock aperture 352 while the hook arm is in the hook engaged position, the lock aperture 352 is retained between the prongs 341, 342 above the lever arm elongated arm 335 until the locking bolt 375 is removed. Thus, the hook arm 350 is detained in the hook engaged position thereby locking the device to any anchor secured to the hook arm 350.

In FIG. 10, the locking coupling 100 is shown in a partially engaged position with the hook arm 350 within the anchor 76, but unsecured. The lever arm 332 is shown at an acute angle from the load binder base 326 and moving downward along arc 399. The extension arm 331 is positioned close to center of the pivot point 215 and load binder base 326. The hook arm 350 is additionally close to center of the pivot point 215 and load binder base 326.

In FIG. 11, the locking coupling 100 is shown in a released position with the hook arm 350 proximate the anchor 76, but unsecured. The lever arm 332 is shown at an obtuse angle from the load binder base 326 and moving downward along arc 398. The extension arm 331 is angled away from center of the pivot point 215 and load binder base 326, thus positioning the hook arm 350 substantially away from center.

The locking shackle 375 may include any circular type structure having a hinged or sliding end 376 connected at one end to a lock body 377. For example, a combination lock or key lock with a unshaped shackle end 376 may be used to engage the lock aperture 352.

As discussed above, the locking coupling 100 secures a vehicle 50 to a foundation or a carrier vehicle. The vehicle 50 is first placed upon a stand 81 in the location having the anchor 76. The stand 81 is preferably placed over the anchor 76 such that the turnbuckle attachment 200 may be positioned as described above. The turnbuckle arms 200 are then connected to a location on the frame 55 of the vehicle 50. The hook arm 350 is then secured to the anchor 76 by placing the hook 350 within the anchor 76 and tensioning the lever arm 332 downward towards the engaged position. In this manner, the hook arm 350 is forced upward towards the pivot point and over center of the load binder base 326 into a hook engaged position. With the hook engaged, the lock aperture 352 is positioned between the prongs 341, 342 of the lever arm above the lever arm elongated arm 335. In this manner, when the locking shackle 375 is placed within the lock aperture 352 while the hook arm is in the hook engaged position, the lock aperture 352 is retained between the prongs 341, 342 above the lever arm elongated arm 335 until the locking bolt 375 is removed. Thus, the hook arm 350 is detained in the hook engaged position thereby locking the device to any anchor secured to the hook arm 350.

The threaded shafts 207, 227, 212, 222 of the turnbuckle arms 200 are adapted to increase the tension for the locking coupling 100 by rotating the sleeve member 209, 214 which rotates the threaded shafts inward or outward within the sleeve member 209, 214. In this manner, a user of the locking coupling 100 can manipulate the length and tension of the turnbuckle arms 200 upon attachment to the transported vehicle 50.

As discussed above, the locking coupling 100 secures a vehicle 50 to a foundation or a carrier vehicle. To remove the vehicle 50, a user of the locking coupling 100 can manipulate the length and tension of the turnbuckle arms 200 to release tension from the locking coupling. The locking shackle 375 is removed from the lock aperture 352, thereby allowing movement of the lever arm 332 upward to a partially engaged position shown in FIG. 10. Once tension is removed from the locking coupling by loosening the turnbuckle arms 200 and releasing the load binder 300, the turnbuckle arms may be unsecured from the vehicle.

In describing a preferred embodiment of the invention illustrated in the drawings, specific terminology has been used for the sake of clarity. However, the invention is not intended to be limited to the specific terms selected, and it is to be understood that each specific term includes all technical equivalents which operate in a similar manner to accomplish a similar purpose.

What is claimed is:

1. A locking coupling for use with a multi-legged stand, said locking coupling adapted to immobilize a frame of a vehicle by securing the vehicle to an anchor connected to a foundation of a location, said locking coupling comprising:
   a turnbuckle attachment comprising a pivot point and at least two adjustable turnbuckle arms movably connected to said pivot point and each arm having a securing terminus adapted to secure to the frame of the vehicle; and
   a load binder assembly comprising:
      a load binder connected to said pivot point, said load binder comprising:
      an extension arm;
      a lever arm adapted to move said extension arm from a released position to an engaged position, and
      a hook arm having a lock aperture and adapted to removably connect to the anchor, said hook arm connected to said extension arm so that movement of said extension arm from said released position to said engaged position biases said hook arm from a hook released position to a hook engaged position;
      a shackle adapted for installation within said lock aperture;
   whereby said shackle prevents movement of said hook arm in said hook engaged position when said hook arm is connected to said anchor deterring movement of the vehicle from the location.

2. The turnbuckle attachment of claim 1, said securing terminus of said at least two adjustable turnbuckle arms each includes a hook.

3. The load binder assembly of claim 1, said shackle attached to a lock body.

4. The load binder assembly of claim 1, said hook arm having said lock aperture positioned upon said hook arm so that said lock aperture is biased between said extension arm and said lever arm when said hook arm is placed in a hook engaged position.

5. The locking coupling of claim 1, the multi-legged stand positioned above the anchor with a first of said at least two adjustable turnbuckle arms engaged between a pair of legs of the multi-legged stand and a second of said at least two adjustable turnbuckle arms engaged between another pair of legs of the multi-legged stand.

6. A locking coupling for immobilizing a frame of a transported vehicle within a carrier vehicle having an anchor by securing the transported vehicle to the anchor of the carrier vehicle, said locking coupling comprising:
    a stand having a top surface and three or more legs;
    a turnbuckle attachment comprising a pivot point and at least two turnbuckle arms movably connected to said pivot point and each arm having a securing terminus adapted to secure to the frame of the transported vehicle;
    a load binder connected to said pivot point;
    a lever arm connected to said load binder and adapted to move from a released position to an engaged position,
    a hook arm having a lock aperture and adapted to removably connect to the anchor, said hook arm connected to said lever arm so that movement of said lever arm from said released position to said engaged position biases said hook arm from a hook released position to a hook engaged position; and
    a shackle adapted for installation within said lock aperture.

7. The locking coupling of claim 6, said stand positioned above said anchor with a first of said at least two turnbuckle arms engaged between a pair of said three or more legs and a second of said at least two turnbuckle arms engaged between another pair of said three or more legs.

8. The turnbuckle attachment of claim 6, said securing terminus of said at least two turnbuckle arms each includes a hook.

9. The load binder assembly of claim 6, said shackle attached to a lock body.

10. The load binder assembly of claim 6, said load binder further comprising an extension arm, so that movement of said lever arm from said released position to said engaged position biases said extension arm from a released position to an engaged position.

11. The load binder assembly of claim 10, said hook arm connected to said extension arm so that movement of said extension arm from said extension arm released position to said extension arm engaged position biases said hook arm from a hook released position to a hook engaged position.

12. The load binder assembly of claim 11, said hook arm having said lock aperture positioned upon said hook arm so that said lock aperture is biased between said extension arm and said lever arm when said hook arm is placed in a hook engaged position.

13. The turnbuckle attachment of claim 6, said at least two turnbuckle arms adapted to increase tension between said pivot point and the frame of the transported vehicle secured by said securing terminus.

14. A locking coupling for immobilizing a frame of a vehicle, said locking coupling comprising:
    a stand having three or more legs;
    a pivot point;
    at least two turnbuckle arms movably connected to said pivot point and each having a securing terminus adapted to secure to the frame of the vehicle;
    an anchor secured to a foundation;
    a lever arm connected to said pivot point and adapted to move from a released position to an engaged position,
    a hook arm having a lock aperture and connected to said lever arm so that movement of said lever arm from said released position to said engaged position biases said hook arm from a hook released position to a hook engaged position; and
    a lock comprising a shackle adapted for installation within said lock aperture and a locking body for securing said shackle in a locked arrangement.

15. The locking coupling of claim 14, said stand positioned above said anchor with a first of said at least two turnbuckle arms engaged between a pair of said three or more legs and a second of said at least two turnbuckle arms engaged between another pair of said three or more legs.

16. The locking coupling of claim 14 further comprising an extension arm, so that movement of said lever arm from said released position to said engaged position biases said extension arm from a released position to an engaged position.

17. The locking coupling of claim 16, said hook arm connected to said extension arm so that movement of said extension arm from said extension arm released position to said extension arm engaged position biases said hook arm from a hook released position to a hook engaged position.

18. The locking coupling of claim 17, said hook arm having said lock aperture positioned upon said hook arm so that said lock aperture is biased between said extension arm and said lever arm when said hook arm is placed in a hook engaged position.

19. The locking coupling of claim 14, said at least two turnbuckle arms adapted to increase tension between said pivot point and the frame of the vehicle secured by said securing terminus.

20. The locking coupling of claim 14, said securing terminus of said at least two turnbuckle arms each includes a hook.

* * * * *